(12) United States Patent
Moll et al.

(10) Patent No.: US 11,949,969 B1
(45) Date of Patent: Apr. 2, 2024

(54) MIXED REALITY MEDIA CONTENT

(71) Applicant: Snap Inc., Santa Monica, CA (US)

(72) Inventors: Sharon Moll, Lachen (CH); Piotr Gurgul, Hergiswil (CH); Dawei Zhang, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/956,603

(22) Filed: Sep. 29, 2022

(51) Int. Cl.
*H04N 21/8545* (2011.01)
*G06F 3/04817* (2022.01)
*G06K 19/06* (2006.01)

(52) U.S. Cl.
CPC ..... *H04N 21/8545* (2013.01); *G06F 3/04817* (2013.01); *G06K 19/06037* (2013.01)

(58) Field of Classification Search
None
See application file for complete search history.

(56) References Cited

U.S. PATENT DOCUMENTS

2017/0323488 A1* 11/2017 Mott ................ G06Q 30/0643
2023/0199102 A1*  6/2023 Yun ..................... H04N 23/632
                                                                345/902

* cited by examiner

*Primary Examiner* — James R Marandi
(74) *Attorney, Agent, or Firm* — Schwegman Lundberg & Woessner, P.A.

(57) ABSTRACT

A mixed-reality media content system may be configured to perform operations that include: causing display of image data at a client device, the image data comprising a depiction of an object that includes a graphical code at a position upon the object; detecting the graphical code at the position upon the depiction of the object based on the image data; accessing media content within a media repository based on the graphical code scanned by the client device; and causing display of a presentation of the media content at the position of the graphical code upon the depiction of the object at the client device.

20 Claims, 10 Drawing Sheets

MIXED REALITY MEDIA CONTENT

BACKGROUND

The physical nature of printed material allows a user to physically flip through its pages to view content. A drawback of physical books, periodicals and paper is due to the permanent setting of information on their pages.

Augmented reality (AR) is an interactive experience of a real-world environment where the objects that reside in the real world are enhanced by computer-generated perceptual information, sometimes across multiple sensory modalities. The overlaid sensory information can be constructive (i.e. additive to the natural environment), or destructive (i.e. masking of the natural environment).

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
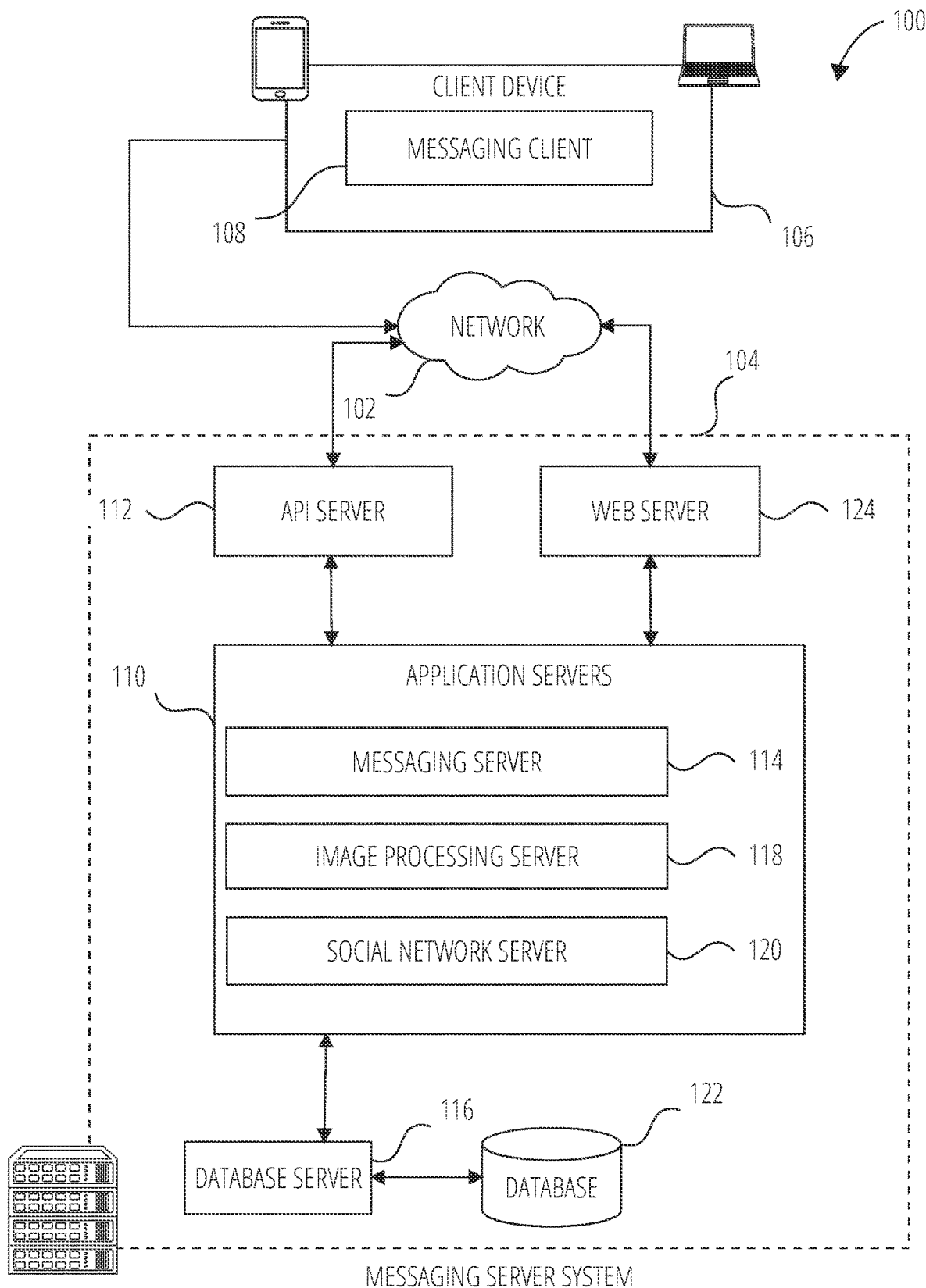
FIG. 1 is a diagrammatic representation of a networked environment in which the present disclosure may be deployed, in accordance with some examples.

As discussed above, AR is an interactive experience of a real-world environment where the objects that reside in the real world are enhanced by computer-generated perceptual information. According to certain example embodiments, a system to display mixed-reality content responsive to detecting the presence of a graphical coded image, such as a QR code, is discussed herein. For example, a mixed-reality media content system may be configured to perform operations that include: causing display of image data at a client device, the image data comprising a depiction of an object that includes a graphical code at a position upon the object; detecting the graphical code at the position upon the depiction of the object based on the image data; accessing media content within a media repository based on the graphical code scanned by the client device; and causing display of a presentation of the media content at the position of the graphical code upon the depiction of the object at the client device.

In some embodiments, the graphical coded image may be generated based on inputs received from a user of a client device. For example, the system may present a graphical editor at the client device, wherein the graphical editor may provide resources to generate the graphical coded image.

In some embodiments, responsive to detecting a graphical code, the system may perform one or more surface detection techniques in order to determine the skew, rotation, and position of the surface of the object in which the graphical code is applied. Accordingly, the system may present the media content based on the skew, rotation, and position of the surface of the object.

In some embodiments, the graphical code may be presented within a boundary, such as a bounding box. Responsive to detecting the graphical code, the system may detect or otherwise identify the bounding box in order to display the media content within the boundary defined by the bounding box. Accordingly, the media content may be fitted or scaled in order to fit within the boundary.

For example, in some embodiments, the media content may be proportionally scaled to fit within the boundary of the bounding box by at least one dimension, with no cut-off of the media content. In some embodiments, the media content may be scaled proportionally to fill the entire boundary defined by the bounding box, with cut-off of the media content in a dimension which overlaps the border of the bounding box.

The system may access depth information generated by the client device in order to generate a depth map that represents a curvature of a surface of the object. The system may transform the depth map into a vector object (i.e., 3D mesh), wherein the vector object may be utilized to render the media object based on the detected curvature. In some embodiments, the system may reduce the depth map to a resolution of 1 vector per square centimeter to improve mesh rendering speed while retaining a sufficient resolution for the curvatures.

In some embodiments, the depth map may be updated at a regular time interval (i.e., every X seconds) in order to ensure that the 3D mesh provides an accurate representation of the curvature of the surface of the object. In some embodiments, the 3D mesh may be updated responsive to detecting a significant change in the depth map, using thresholds. For example, the system may actively monitor depth values of the surface of the object in order to perform a comparison of the depth map associated with a first 3D mesh with the monitored depth values. Upon detecting a threshold change in depth value, the system may generate an updated 3D mesh.

In some embodiments, the system may apply one or more canny edge detection algorithms in order to detect edges or frames within the bounds of the detected surface area in order to present the selected media content within the bounds of the detected surface area. For example, the media content may be proportionally scaled to fit within a frame defined by the bounds of the detected surface area, or may be scaled proportionally to fit the frame entirely.

In some embodiments, the system may receive inputs, such as tactile or hand-tracking inputs, from the client device. Upon receiving the inputs, the system may detect a collision between attributes of the input (i.e., landmarks of the hand-tracking input), and one or more features of the media content. For example, the one or more features of the media content may include a display of one or more interactive icons, wherein each icon among the one or more interactive icons may correspond with a function associated with the media content. The system may then execute a function or further feature of the media content based on the detected collision.

Consider an illustrative example from a user perspective. A user of a client device may scan a graphical coded image, such as a QR code, wherein the graphical coded image is printed upon a newspaper or magazine, and encompassed by a bounding box. Upon scanning the graphical coded image, the system may access a repository to retrieve media content identified by the graphical coded image.

The system may then determine a curvature and orientation associated with the newspaper or magazine, and may thereby render a display of the media content upon the newspaper or magazine based on the boundary defined by the bounding box, the curvature, and the orientation. Accordingly, the system may either scale the media content to fit within the boundary of the bounding box with no cut-off, or may scale the media content such that the displayed media content fills the bounding box completely with a portion of the media content being cut-off. A user of the client device may then view the media content within a GUI of the client device, and may provide a tactile input, wherein the tactile input may collide with the media content within the presentation of the media content at the client device. Accordingly, the system may access further content, or otherwise execute a function associated with the media content based on the input.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
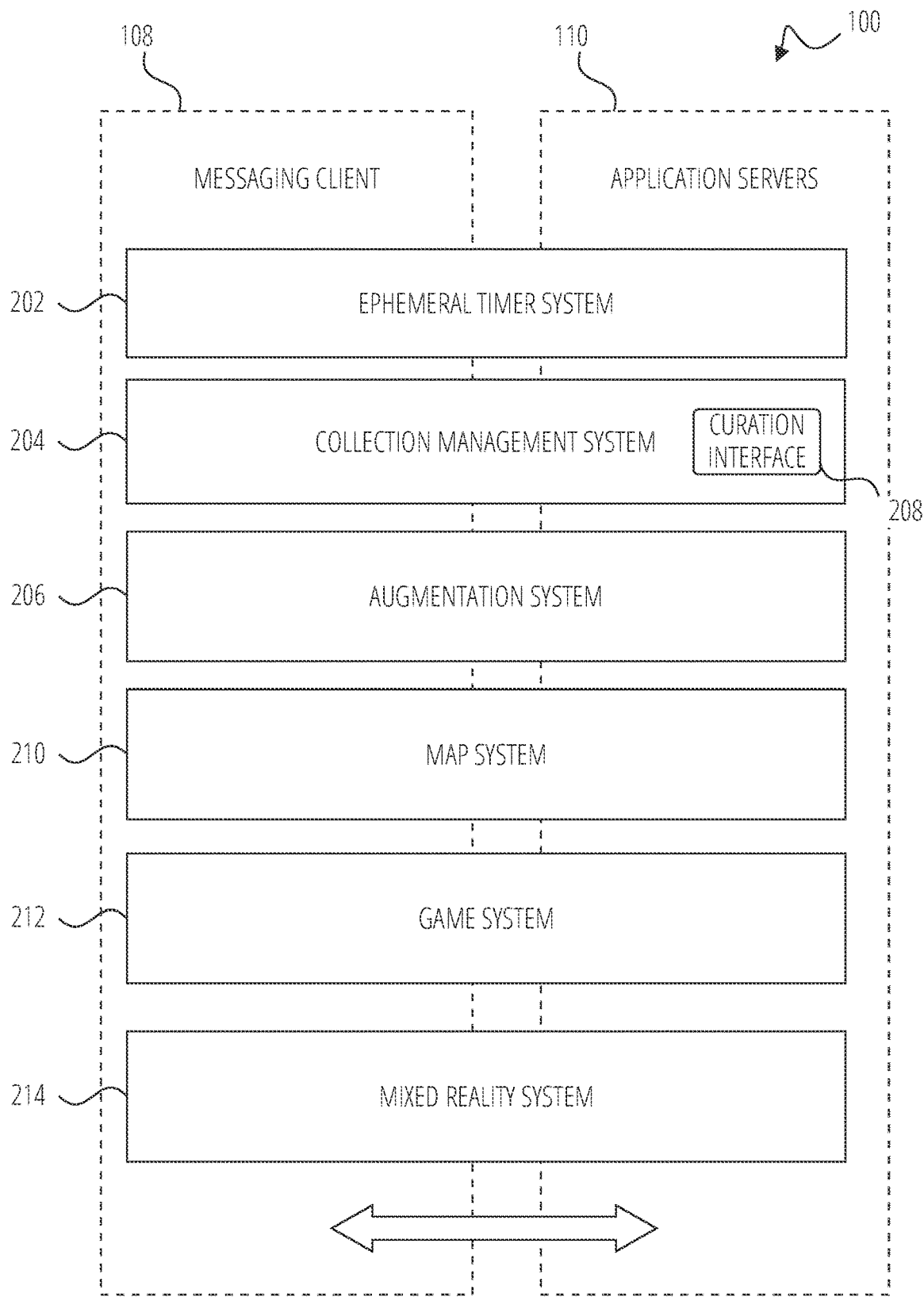
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a mixed reality system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

According to certain embodiments, the mixed reality system 214 provides functions that may include: causing display of image data at a client device, the image data comprising a depiction of an object that includes a graphical code at a position upon the object; detecting the graphical code at the position upon the depiction of the object based on the image data; accessing media content within a media repository based on the graphical code scanned by the client device; and causing display of a presentation of the media content at the position of the graphical code upon the depiction of the object at the client device.

Figure 3:
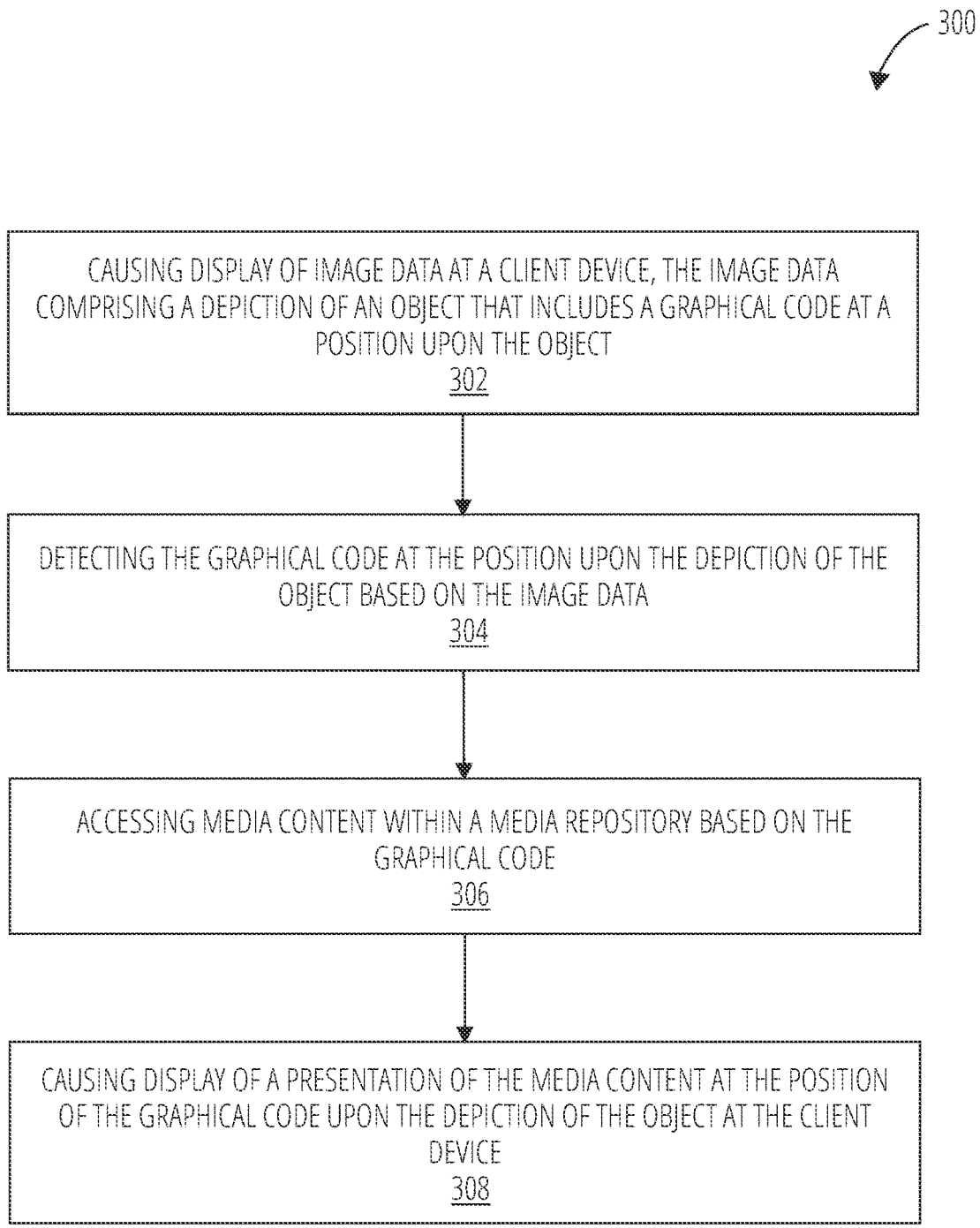
FIG. 3 is a flowchart depicting a method for generating and causing display of mixed-reality media content, in accordance with one embodiment.

FIG. 3 is a flowchart illustrating operations of a mixed reality system 214 in performing a method 300 for generating and causing display of mixed-reality media content, in accordance with one embodiment. Operations of the method 300 may be performed by one or more subsystems of the messaging system 100 described above with respect to FIG. 2, such as the mixed reality system 214. As shown in FIG. 3, the method 300 includes one or more operations 302, 304, 306, and 308.

At operation 302, the mixed reality system 214 causes display of image data at a client device 106, wherein the image data comprises a depiction of an object that includes a graphical code at a position upon the object.

At operation 304, the mixed reality system 214 detects the graphical code at the position upon the depiction of the object based on the image data. Responsive to detecting the graphical code, at operation 306 the mixed reality system 214 accesses media content within a media repository based on the graphical code.

At operation 308, the mixed reality system 214 causes display of a presentation of the media content at the position of the graphical code upon the depiction of the object within a GUI of the client device 106.

Figure 4:
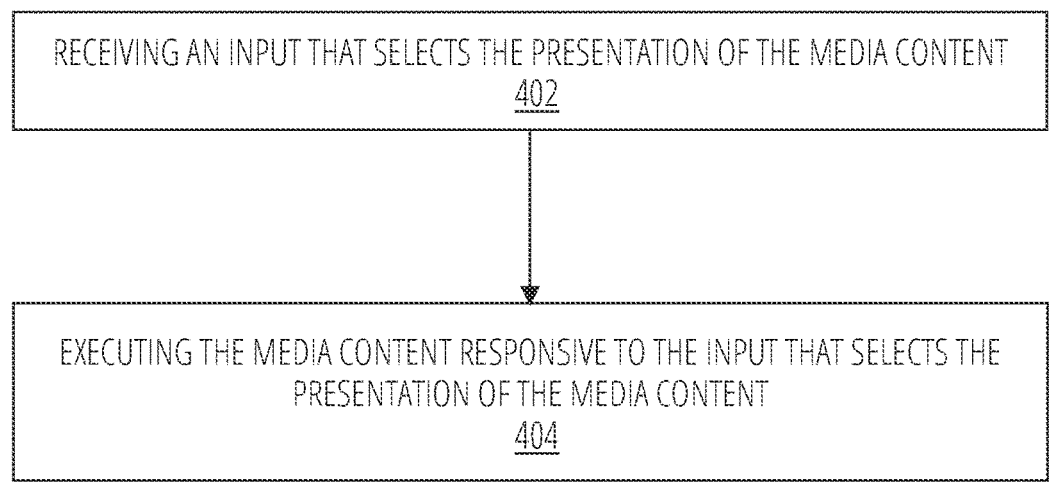
FIG. 4 is a flowchart depicting a method for executing a function associated with the media content responsive to an input that selects the media content, in accordance with one embodiment.

FIG. 4 is a flowchart illustrating operations of a mixed reality system 214 in performing a method 400 for executing a function associated with the media content responsive to an input that selects the media content, in accordance with one embodiment. Operations of the method 400 may be performed by one or more subsystems of the messaging system 100 described above with respect to FIG. 2, such as the mixed reality system 214. As shown in FIG. 4, the method 400 includes one or more operations 402, and 404.

At operation 402, the mixed reality system 214 receives an input that selects the presentation of the media content from the client device 106. Upon receiving the input, the system may detect a collision between attributes of the input (i.e., landmarks of the hand-tracking input), and one or more features of the presentation of the media content. For example, the one or more features of the media content may include a display of one or more interactive icons, wherein each icon among the one or more interactive icons may correspond with a function associated with the media content.

At operation 404, the mixed reality system 214 may then execute a function or further feature of the media content based on the detected collision. For example, in some embodiments the media content may include a video, wherein execution of the video may include playing the video.

Figure 5:
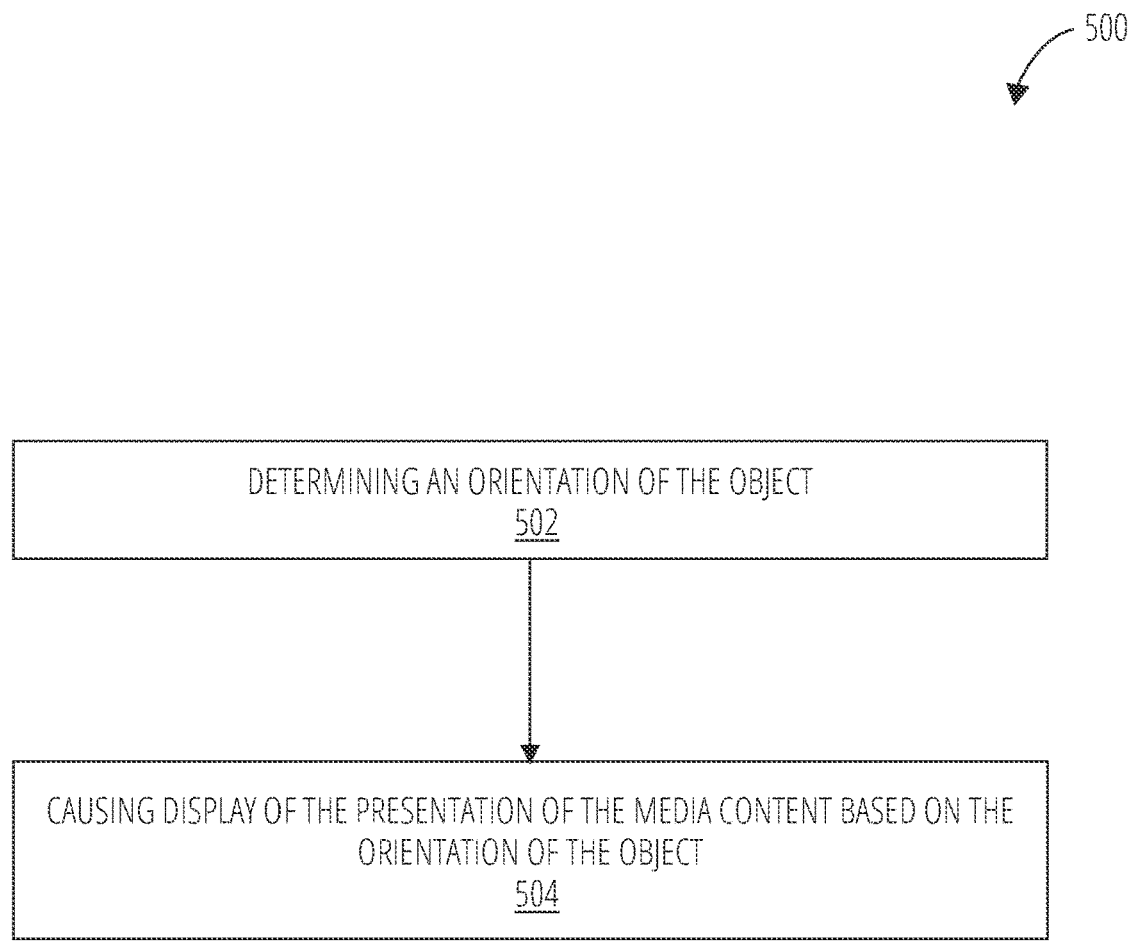
FIG. 5 is a flowchart depicting a method for generating and causing display of mixed-reality media content, in accordance with one embodiment

FIG. 5 is a flowchart illustrating operations of a mixed reality system 214 in performing a method 500 for generating and causing display of mixed-reality media content, in accordance with one embodiment. Operations of the method 500 may be performed by one or more subsystems of the messaging system 100 described above with respect to FIG. 2, such as the mixed reality system 214. As shown in FIG. 5, the method 500 includes one or more operations 502, and 504.

At operation 502, the mixed reality system 214 determines an orientation of the object upon which the graphical coded image is displayed. For example, in some embodiments, responsive to detecting a graphical coded image within a presentation of image data, the system may perform one or more surface detection techniques in order to determine the skew, rotation, and position of the surface of the object in which the graphical coded image is applied.

In some embodiments, the system may access depth information in order to generate a depth map that represents a curvature of a surface of the object. The system may transform the depth map into a vector object (i.e., 3D mesh), wherein the vector object may be utilized to render the media object based on the detected curvature. In some embodiments, the system may reduce the depth map to a resolution of 1 vector per square centimeter to improve mesh rendering speed while retaining a sufficient resolution for the curvatures.

In some embodiments, the 3D mesh may be updated responsive to detecting a significant change in the depth map, using thresholds. For example, the system may actively monitor depth values of the surface of the object in order to perform a comparison of the depth map associated with a first 3D mesh with the monitored depth values. Upon detecting a threshold change in depth value, the system may generate an updated 3D mesh.

At operation 504, the mixed reality system 214 causes display of a presentation of the media object based on the detected orientation and the 3D mesh that depicts the curvature of the object.

Figure 6:
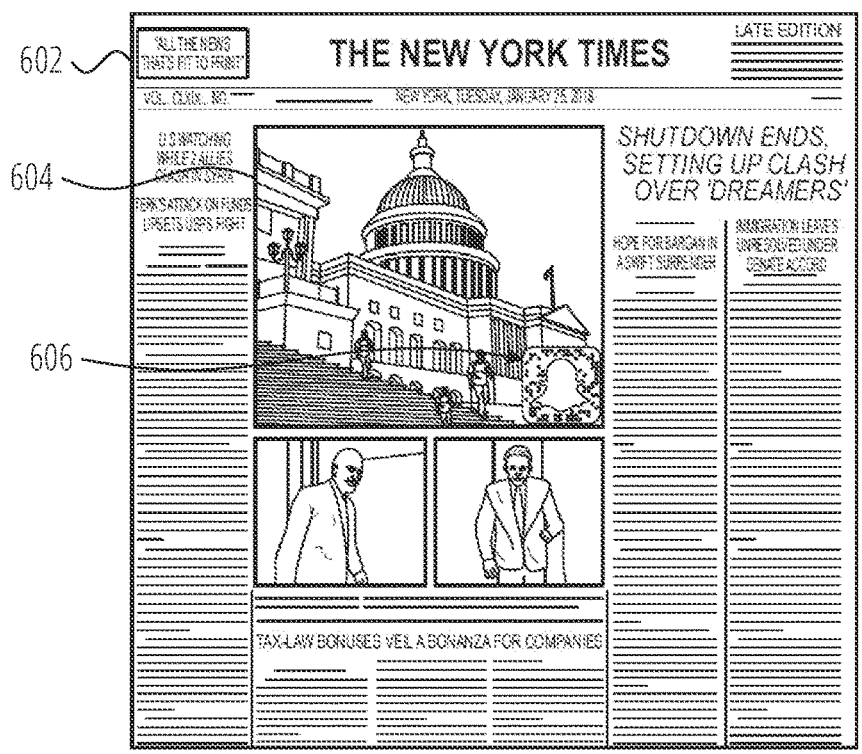
FIG. 6 is an interface diagram depicting a graphical user interface (GUI), in accordance with one embodiment.
Figure 6:
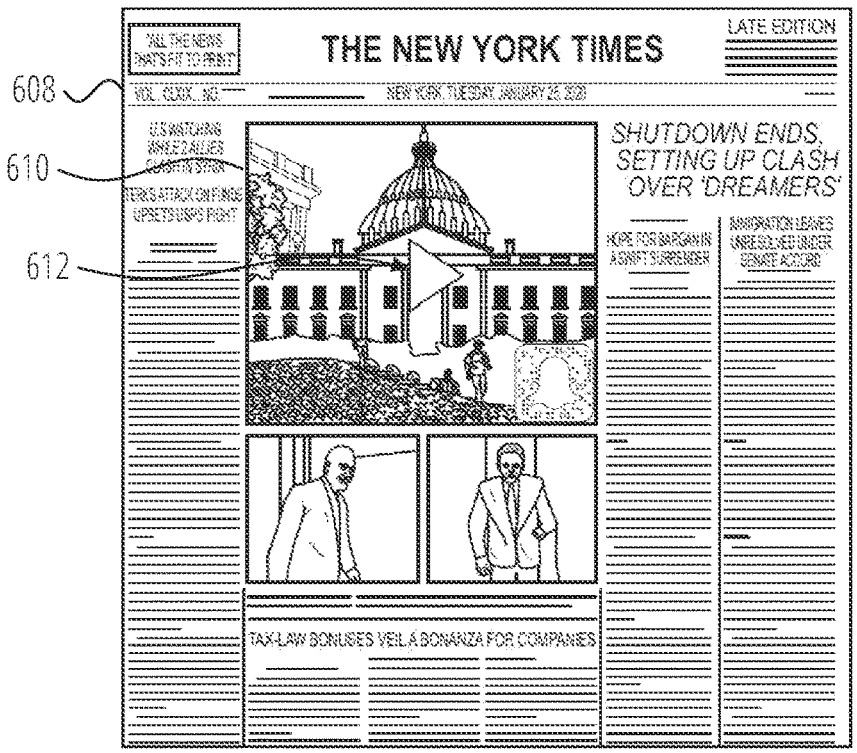

FIG. 6 is an interface diagram 600 depicting a GUI presented by a mixed reality system 214 at a client device 106, in accordance with one embodiment. As seen in the interface 602, a graphical coded image 606 may be depicted upon an object, wherein the object may include a newspaper or magazine. According to certain embodiments, the object may simply comprise a surface in which the graphical coded image 606 may be applied or otherwise depicted upon.

In certain embodiments, the graphical coded image 606 may be surrounded by a border element 604, wherein the border element 604 comprises a boundary that defines a display region for media content associated with the graphical coded image 606 to be displayed upon the surface of the object.

As discussed in the method 300 of FIG. 3, responsive to detecting the presence of the graphical coded image 606, the mixed reality system 214 may access a media repository (i.e., the database 122) to retrieve media content 610, wherein the media content 610 is identified by the graphical coded image 606. In some embodiments, the media content 610 may be identified based on the graphical coded image 606, and one or more contextual factors, wherein the contextual factors include: location data; temporal data; user profile data; device attributes associated with the client device 106; image attributes of the image data; as well as user preferences.

Accordingly, as seen in the interface 608 and as described in the method 300 of FIG. 3, the mixed reality system 214 may cause display of a presentation of the media content 610 upon a surface of the object within a GUI presented at the client device 106. The presentation of the media content 610 may be presented within the boundary 604 by scaling the media content to fit the boundary defined by the bounding box. For example, the media content may be configured such that the system may either scale the media content to fit within the boundary of the bounding box with no cut-off to the media content, or in some embodiments may be scaled such that the media content fills the bounding box with a portion of the media content being cut-off.

As seen in the interface 608, the media content 610 may comprise a display of one or more graphical icons 612, wherein the graphical icons 612 are configured to respond to inputs received from a user of the client device 106. For example, a user of the client device 106 may provide an input that corresponds with a location upon which the media content 610 is displayed upon the surface of the object, wherein the location corresponds with a position of the graphical icon 612 within the display of the client device 106. Responsive to receiving the input, the mixed reality system 214 may execute a command or function associated with the selected graphical icon 612. For example, the mixed reality system 214 may cause a video to begin playing, or may display certain relevant information responsive to receiving the input.

Figure 7:
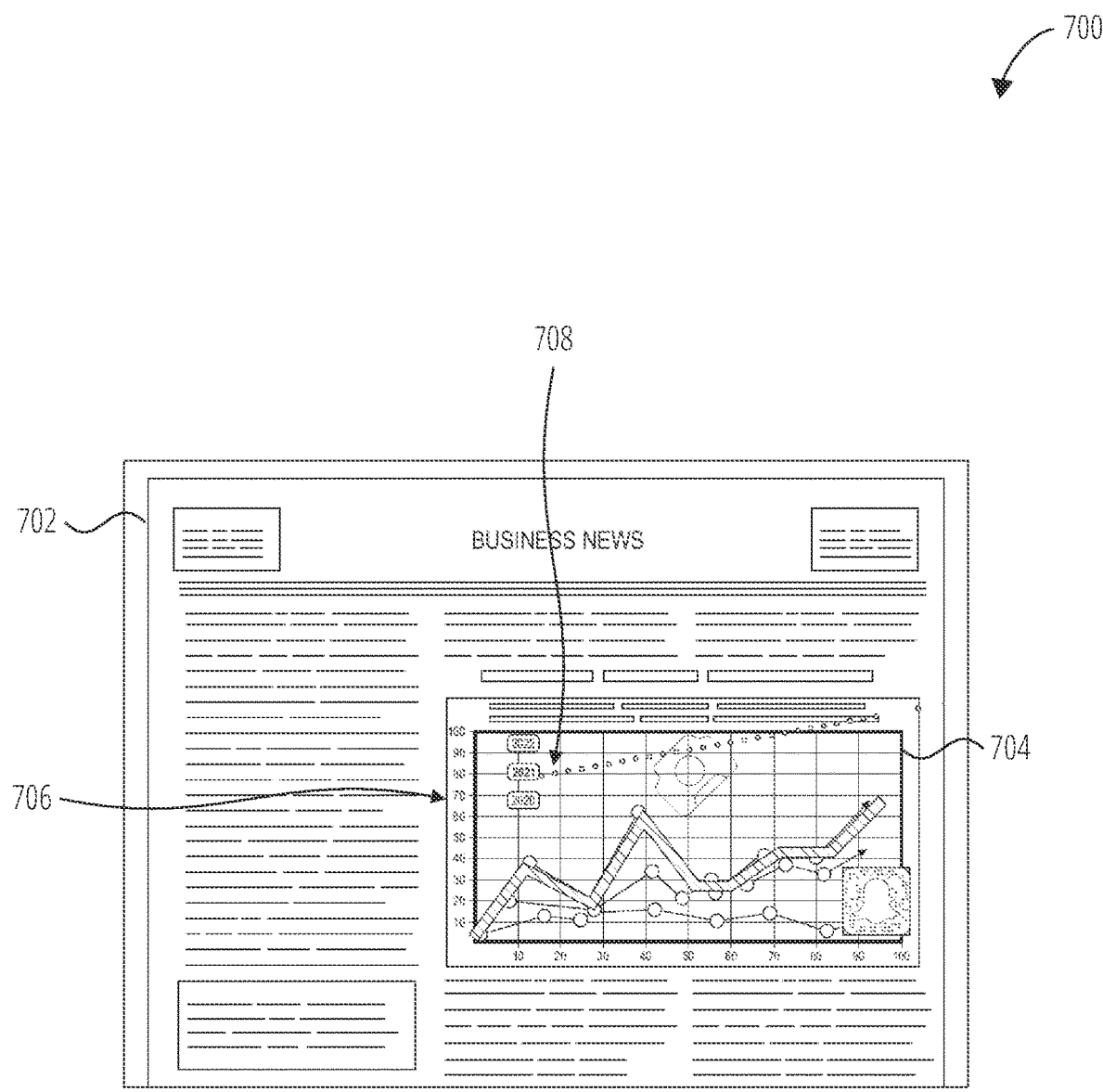
FIG. 7 is an interface diagram depicting a GUI, in accordance with one embodiment.

FIG. 7 is an interface diagram 700 depicting a GUI 702 presented by a mixed reality system 214, in accordance with one embodiment. The interface diagram 700 provides an illustration of mixed-reality media content 704 that may be displayed by the mixed reality system 214. As seen in the GUI 702, the mixed-reality media content 704 may include interactive content 706, wherein the interactive content 706 may include a set of selectable graphical icons 708. For example, each icon among the set of selectable graphical icons may corresponds with additional content associated with the interactive content 706.

For example, a user of the client device 106 may provide an input that selects a graphical icon from among the set of selectable graphical icons 706. As seen in the interface diagram 700, each selectable graphical icon 706 may correspond with a set of data to be presented upon a graph image of the mixed-reality interactive content 704. Accordingly, responsive to receiving an input that selects a selectable graphical icon 706, the mixed reality system 214 may cause the client device 106 to display a set of data (or content) that corresponds with the selected icon. Similarly, each icon among the set of selectable graphical icons 706 may correspond with content that may be presented upon receiving a selection of an icon.

Machine Architecture

Figure 8:
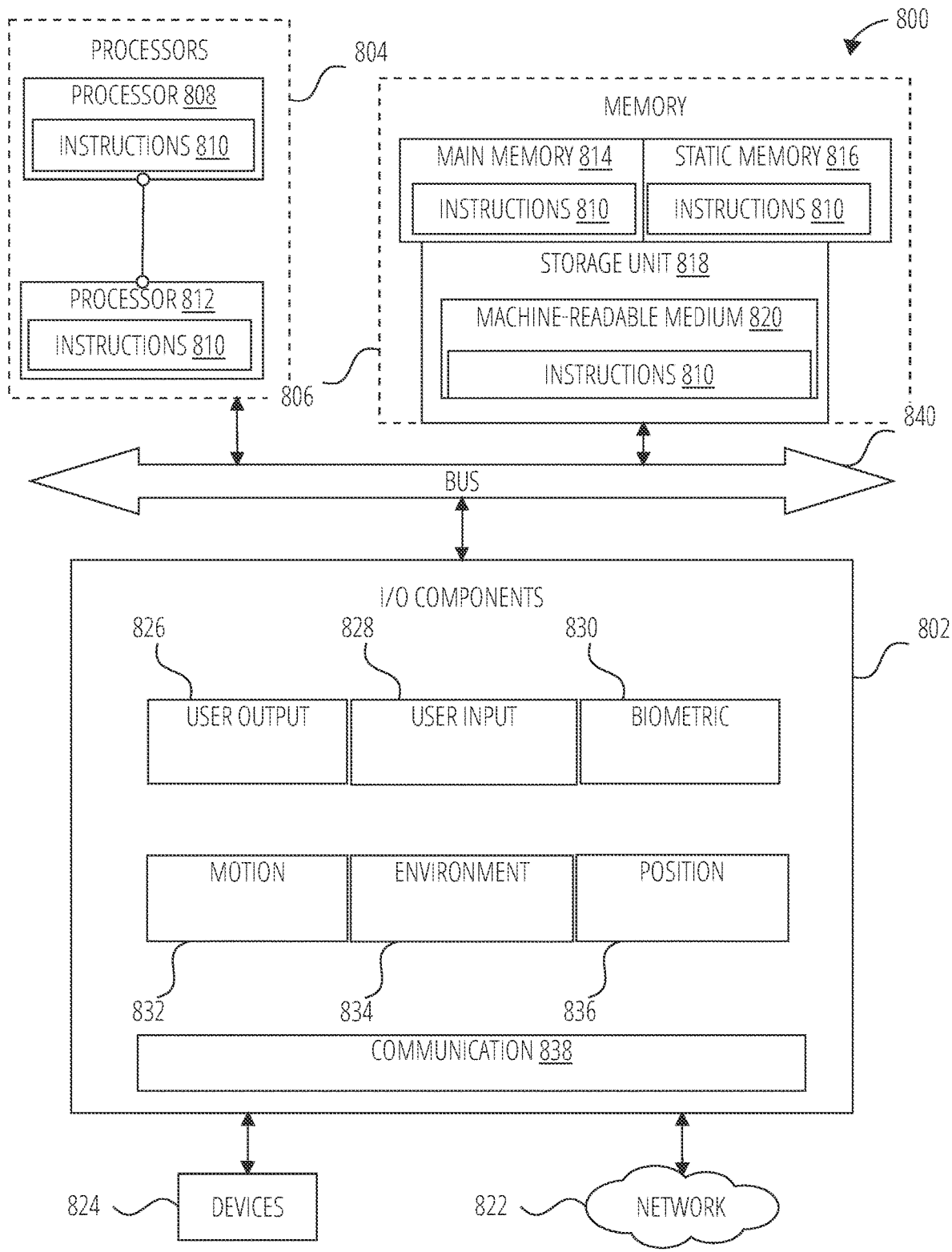
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 810 (e.g., software, a program, an application, an applet, an app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the client device 106 or any one of a number of server devices forming part of the messaging server system 104. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 638, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine 800.

The I/O components 802 may include a wide variety of components to receive input, provide output, produce output, transmit information, exchange information, capture measurements, and so on. The specific U/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface Component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
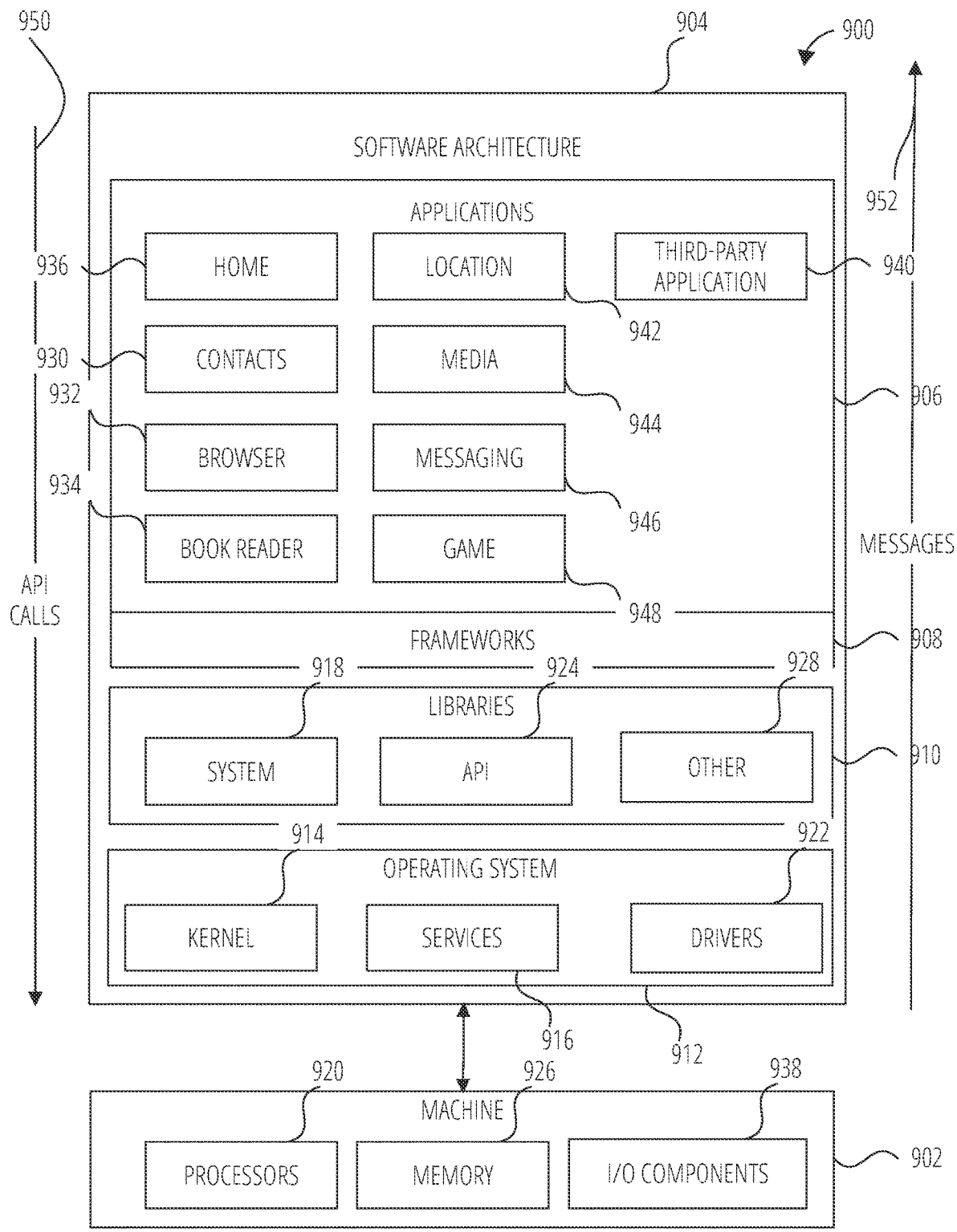
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Processing Components

Figure 10:
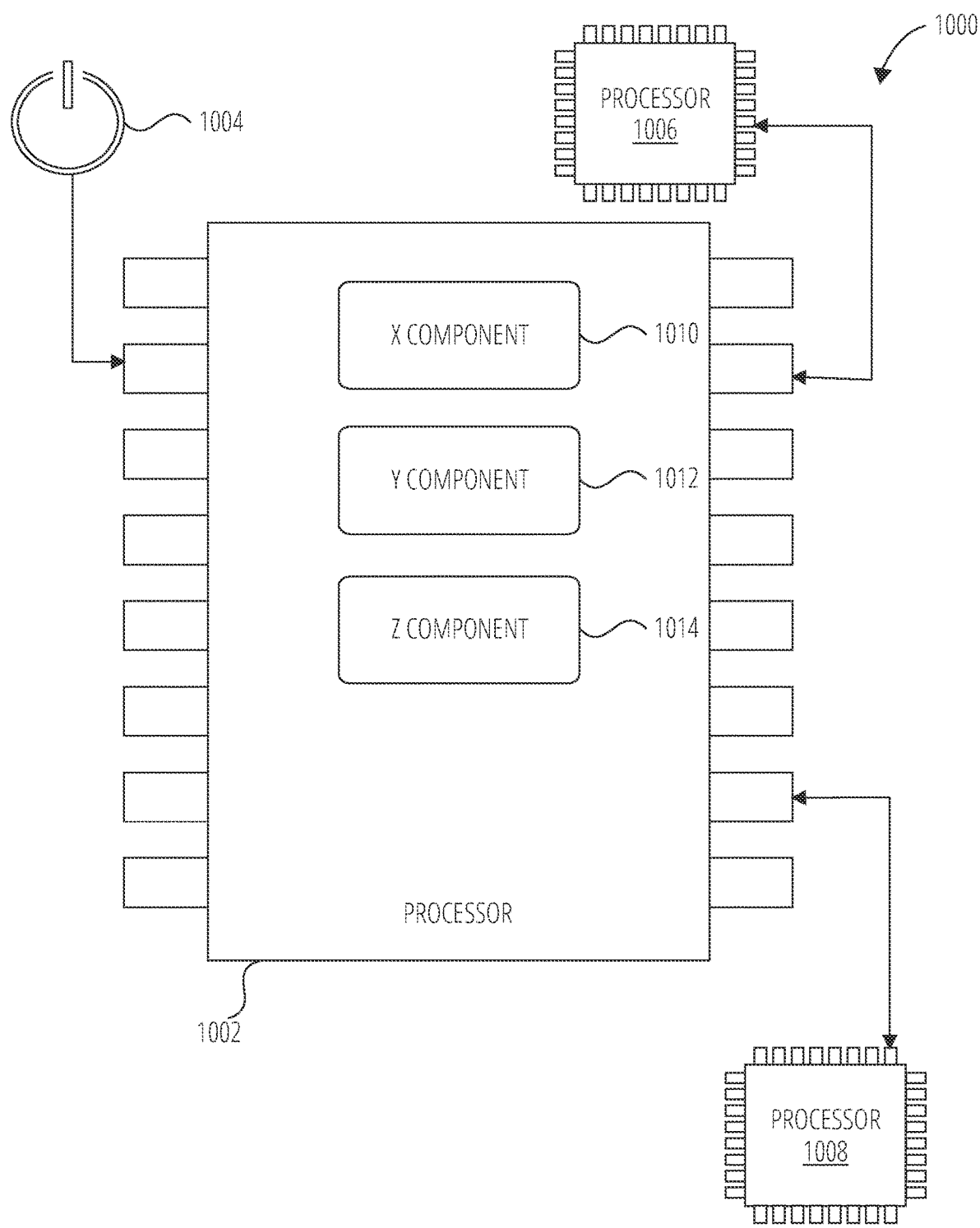
FIG. 10 is a diagrammatic representation of a processing environment, in accordance with some examples.

Turning now to FIG. 10, there is shown a diagrammatic representation of a processing environment 1000, which includes a processor 1002, a processor 1006, and a processor 1008 (e.g., a GPU, CPU or combination thereof).

The processor 1002 is shown to be coupled to a power source 1004, and to include (either permanently configured or temporarily instantiated) modules, namely an X component 1010, a Y component 1012, and a Z component 1014, operationally configured to perform operations as discussed in the method 300 of FIG. 3, and the method 400 (deleted) of FIG. 4 (deleted), in accordance with embodiments discussed herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is provisionally claimed is:

1. A method comprising:
    causing display of image data at a client device, the image data comprising a depiction of an object that includes a graphical code at a position upon the object;
    detecting the graphical code at the position upon the depiction of the object based on the image data;
    accessing media content within a media repository based on the graphical code;
    generating a depth map that describes a curvature of a surface of the object; and
    causing display of a presentation of the media content at the position of the graphical code upon the depiction of the object at the client device, the presentation of the media content based on the curvature of the surface of the object.

2. The method of claim 1, wherein the graphical code comprises a boundary, and wherein the causing display of the presentation of the media content at the position of the graphical code upon the depiction of the object further comprises:
    causing display of the media content within the boundary of the graphical code.

3. The method of claim 1, further comprising:
    receiving an input that selects the presentation of the media content; and
    executing the media content responsive to the input that selects the presentation of the media content.

4. The method of claim 3, wherein the media content comprises video data.

5. The method of claim 3, wherein the media content comprises interactive content that comprises a display of a set of interactive icons, the set of interactive icons including at least a first interactive icon that corresponds with a media action, wherein the input selects the first interactive icon, and wherein the executing the media content responsive to the input that selects the presentation of the media content includes:
    executing the media action that corresponds with the first interactive icon responsive to the input that selects the first interactive icon.

6. The method of claim 1, wherein the graphical code includes a QR code.

7. The method of claim 1, wherein the causing display of the presentation of the media content at the position of the graphical code upon the depiction of the object at the client device further comprises:
    determining an orientation of the object; and
    causing display of the presentation of the media content based on the orientation of the object.

8. A system comprising:
    one or more processors of a machine; and
    a memory storing instructions that, when executed by at least one processor among the one or more processors, causes the machine to perform operations comprising:
        causing display of image data at a client device, the image data comprising a depiction of an object that includes a graphical code at a position upon the object;
        detecting the graphical code at the position upon the depiction of the object based on the image data;
        accessing media content within a media repository based on the graphical code;
        generating a depth map that describes a curvature of a surface of the object; and
        causing display of a presentation of the media content at the position of the graphical code upon the depiction of the object at the client device, the presentation of the media content based on the curvature of the surface of the object.

9. The system of claim 8, wherein the graphical code comprises a boundary, and wherein the causing display of the presentation of the media content at the position of the graphical code upon the depiction of the object further comprises:
    causing display of the media content within the boundary of the graphical code.

10. The system of claim 8, further comprising:
    receiving an input that selects the presentation of the media content; and
    executing the media content responsive to the input that selects the presentation of the media content.

11. The system of claim 10, wherein the media content comprises video data.

12. The system of claim 10, wherein the media content comprises interactive content that comprises a display of a set of interactive icons, the set of interactive icons including at least a first interactive icon that corresponds with a media action, wherein the input selects the first interactive icon, and wherein the executing the media content responsive to the input that selects the presentation of the media content includes:
    executing the media action that corresponds with the first interactive icon responsive to the input that selects the first interactive icon.

13. The system of claim 8, wherein the graphical code includes a QR code.

14. The system of claim 8, wherein the causing display of the presentation of the media content at the position of the graphical code upon the depiction of the object at the client device further comprises:
    determining an orientation of the object; and causing display of the presentation of the media content based on the orientation of the object.

15. A non-transitory machine-readable storage medium comprising instructions that, when executed by one or more processors of a machine, cause the machine to perform operations comprising:
   causing display of image data at a client device, the image data comprising a depiction of an object that includes a graphical code at a position upon the object;
   detecting the graphical code at the position upon the depiction of the object based on the image data;
   accessing media content within a media repository based on the graphical code;
   generating a depth map that describes a curvature of a surface of the object; and
   causing display of a presentation of the media content at the position of the graphical code upon the depiction of the object at the client device, the presentation of the media content based on the curvature of the surface of the object.

16. The non-transitory machine-readable storage medium of claim 15, wherein the graphical code comprises a boundary, and wherein the causing display of the presentation of the media content at the position of the graphical code upon the depiction of the object further comprises:
   causing display of the media content within the boundary of the graphical code.

17. The non-transitory machine-readable storage medium of claim 15, further comprising:
   receiving an input that selects the presentation of the media content; and
   executing the media content responsive to the input that selects the presentation of the media content.

18. The non-transitory machine-readable storage medium of claim 17, wherein the media content comprises video data.

19. The non-transitory machine-readable storage medium of claim 17, wherein the media content comprises interactive content that comprises a display of a set of interactive icons, the set of interactive icons including at least a first interactive icon that corresponds with a media action, wherein the input selects the first interactive icon, and wherein the executing the media content responsive to the input that selects the presentation of the media content includes:
   executing the media action that corresponds with the first interactive icon responsive to the input that selects the first interactive icon.

20. The non-transitory machine-readable storage medium of claim 15, wherein the graphical code includes a QR code.

* * * * *